United States Patent
Honse et al.

(10) Patent No.: US 9,914,551 B2
(45) Date of Patent: Mar. 13, 2018

(54) PASSIVE TIMING OF ASYNCHRONOUS IMU ATTITUDE DATA

(71) Applicant: The Boeing Company, Chicago, IL (US)

(72) Inventors: Adam Honse, Hermosa Beach, CA (US); Richard A. Fowell, Rolling Hills Estates, CA (US)

(73) Assignee: The Boeing Company, Chicago, IL (US)

( * ) Notice: Subject to any disclaimer, the term of this patent is extended or adjusted under 35 U.S.C. 154(b) by 691 days.

(21) Appl. No.: 14/316,224

(22) Filed: Jun. 26, 2014

(65) Prior Publication Data
US 2015/0378360 A1    Dec. 31, 2015

(51) Int. Cl.
*G05D 1/08* (2006.01)
*B64G 1/24* (2006.01)
*B64G 1/36* (2006.01)
*B64G 1/28* (2006.01)

(52) U.S. Cl.
CPC ............... *B64G 1/36* (2013.01); *B64G 1/288* (2013.01); *B64G 1/366* (2013.01)

(58) Field of Classification Search
None
See application file for complete search history.

(56) References Cited

U.S. PATENT DOCUMENTS

| 5,610,848 | A | 3/1997 | Fowell | |
|---|---|---|---|---|
| 5,796,787 | A * | 8/1998 | Chen | H04L 7/027 375/326 |
| 6,285,927 | B1 * | 9/2001 | Li | B64G 1/24 244/164 |
| 6,863,244 | B2 | 3/2005 | Fowell et al. | |
| 7,487,016 | B2 | 2/2009 | Fowell et al. | |
| 2002/0015424 | A1 * | 2/2002 | Preston | G01S 5/0027 370/503 |

OTHER PUBLICATIONS

An Interpretation of MIL-STD-1553B, Doc: 1553 Interpretation.fm, ver 2.0, May 26, 1998, 13:23.
(Continued)

*Primary Examiner* — Jerrah Edwards
*Assistant Examiner* — Paul Castro
(74) *Attorney, Agent, or Firm* — Duft Bornsen & Fettig LLP

(57) ABSTRACT

Embodiments described herein provide for passive timing of asynchronous Inertial Measurement Unit (IMU) attitude data using information derived from a pattern of skipped and duplicate samples of attitude data generated by the IMU. One embodiment is an attitude controller for a vehicle that generates samples of attitude data at a first frequency (f1) from an IMU of the vehicle. The IMU updates the attitude data at a second frequency (f2). Each update of the attitude data includes a time stamp. The attitude controller is processes time stamps in the samples to identify a pattern of at least one of a skipped sample of an update to the attitude data and a duplicate sample of an update to the attitude data. The attitude controller estimates lag times between updates of the attitude data and samples of the attitude data based on the pattern and a relationship between f1 and f2.

20 Claims, 7 Drawing Sheets

(56) References Cited

OTHER PUBLICATIONS

Applications-MIL-STD-1553, http://www.milstd1553.com/applications, Mar. 24, 2014.
Astrix 120, A Cost-eective, High Performance Inertial Measurement Unit, Astrium, Ixsea.
E-SIGI Enhanced Space Integrated GPS/INS, Inertial Navigation System with Embedded GPS Receiver and Mission Computer, Honeywell, DFOISR: 04-S-1703, Jun. 2004.
Fowell et al., Faster Plots by Fan Data-Compression, Hughes Aircraft, IEEE Computer Graphics &Applications, 1989 IEEE.
Henrikson et al., Proceedings of the Symposium on Spacecraft Attitude Determination, Sep. 30, Oct. 1-2, 1969. vol. I. Unclassified Papers, Aerospace Corporation, El Segundo, CA, Oct. 31, 1969.
O'Shaughnessy et al., Messenger IMU Interface Timing Issues and In-Flight Calibration Results, 29th Annual AAS Guidance and Control Conference, AAS 06-086.
Shmaliy et al., GPS-Based FIR Estimation and Steering of Clock Errors: A Review, Recent Patents on Space Technology, 2011, 1, 134-149.
Step-by-Step Guide to 1553 Design.

* cited by examiner

US 9,914,551 B2

PASSIVE TIMING OF ASYNCHRONOUS IMU ATTITUDE DATA

GOVERNMENT LICENSE RIGHTS

The Government has certain rights to the invention.

FIELD

This disclosure relates to the field of attitude control for vehicles that utilize Inertial Measurement Units.

BACKGROUND

Vehicles (e.g., spacecraft, aerial vehicles, etc.) sometimes utilize an Inertial Measurement Unit (IMU) for calculating a position or attitude of the vehicle. IMU is often used interchangeably with Inertial Reference Unit (IRU), and any discussion of an IMU described herein may also refer to an IRU. An IMU or an IRU may include any combination of accelerometers, magnetometers, and/or gyroscopes as a matter of design choice. An IMU and/or an IRU generate attitude data regarding the vehicle's velocity, orientation, and gravitational forces using a combination of accelerometers, and/or gyroscopes, and/or magnetometers, etc. A computer may then calculate the current position of the vehicle by integrating over time the attitude data generated by the IMU. In some cases, the computer and the IMU operate asynchronously with respect to each other, which may cause problems in determining the current position of the vehicle accurately.

For instance, a satellite computer may utilize one reference clock to read samples of attitude data from the IMU, while the IMU may utilize a different reference clock to generate updates to the attitude data. In this case the IMU update to the attitude data occurs at one moment in time while the satellite computer sample of the attitude data occurs at another moment in time. The result is a time lag. If the time lag is constant, then this may be compensated for by the satellite computer. However, when the satellite computer and the IMU operate asynchronously with respect to each other, then the time lag varies over time. This may cause problems when the attitude data is changing dynamically. For instance, if the satellite is experiencing dynamic motions, then the time lag may introduce errors in the integrated solution of the IMU output data that is used by the satellite computer to calculate a current position of the vehicle. Further, the time lag may cause problems when the IMU data is correlated back to other positional data systems. For example, a satellite may use non-IMU positional information such as star trackers to generate positional information for the satellite, which is then used to correct the IMU calculated position. However, a dynamically changing time lag in the IMU attitude data can make this process less accurate.

In some applications, various active processes may be used to synchronize the sampling clock of the satellite computer with the update clock of the IMU. For example, when the satellite computer and the IMU communicate over an asynchronous Mil-STD 1553 data bus, synchronization mode code broadcast messages may be generated by the satellite computer for devices on the bus, which will ideally prompt the devices to reset (or set) their respective internal clocks based on the broadcast. However, not all 1553 bus devices support synchronization mode code broadcast messages, and such support may be vendor specific. Further, generating synchronization mode code broadcast messages may have unintended consequences when devices do not fully support such broadcast messages. In addition, broadcast messages utilize bandwidth on the bus, which may not be available. While external synchronization lines may be used in some cases, this adds complexity and introduces possible points of failure.

SUMMARY

Embodiments described herein provide for passive timing of asynchronous IMU attitude data using information derived from a pattern of skipped and duplicate samples of the attitude data. The pattern of skipped and duplicate samples provides additional information to a system that samples the IMU attitude data, thereby allowing the system to reduce the uncertainty in the timing relationship between the IMU and the system. This information may be used in a variety of ways to improve the performance of vehicles that rely on IMU attitude data for inertial position calculations.

One embodiment is an attitude controller for a vehicle that is configured to generate samples of attitude data at a first frequency (f1) from an IMU of the vehicle. The IMU updates the attitude data at a second frequency (f2). Each update of the attitude data includes a time stamp. The attitude controller is configured to process time stamps in the samples to identify a pattern of at least one of a skipped sample of an update to the attitude data and a duplicate sample of an update to the attitude data. The attitude controller is configured to estimate lag times between updates of the attitude data and samples of the attitude data based on the pattern and a relationship between f1 and f2.

Another embodiment is an attitude controller for a vehicle that is configured to generate samples of attitude data at a first frequency (f1) from an IMU of the vehicle. The IMU updates the attitude data at a second frequency (f2). Each update of the attitude data includes a time stamp. The attitude controller is configured to process time stamps in the samples to identify a pattern of at least one of a skipped sample of an update to the attitude data and a duplicate sample of an update to the attitude data, to sum the pattern over a least common multiple of f1 and f2, to determine that the sum matches a pre-defined value, and to estimate the lag time of a last sample based on f1, f2, and the least common multiple.

Another embodiment is an attitude controller for a vehicle that is configured to generate samples of attitude data at a first frequency (f1) from an IMU of the vehicle. The IMU updates the attitude data at a second frequency (f2). Each update of the attitude data includes a time stamp. The attitude controller is configured to process time stamps in the samples to identify a pattern of at least one of a skipped sample of an update to the attitude data and a duplicate sample of an update to the attitude data, to calculate an upper bound of estimated lag and a lower bound of estimated lag for each sample based on the pattern and the relationship between f1 and f2, and to estimate lag times between updates of the attitude data and samples of the attitude data based on the upper bound of estimated lag and the lower bound of estimated lag for each sample.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments are now described, by way of example only, and with reference to the accompanying drawings. The same reference number represents the same element or the same type of element on all drawings

DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
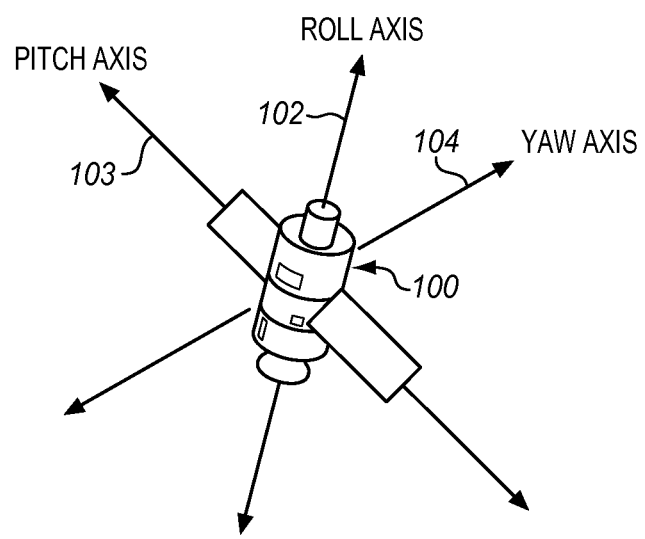
FIG. 1 illustrates a vehicle that utilizes an attitude controller for passive timing of asynchronous IMU attitude data in an exemplary embodiment.

FIG. 1 illustrates a vehicle 100 that utilizes an attitude controller for passive timing of asynchronous IMU attitude data in an exemplary embodiment. In this embodiment, vehicle 100 is depicted as a spacecraft (e.g., a satellite in orbit around the earth, an interplanetary spacecraft, etc.) although in other embodiments vehicle 100 may be an aircraft, an underwater vehicle, a missile, a rocket, etc. Generally, vehicle 100 may include any system that utilizes IMU data for inertial guidance. In FIG. 1, three mutually orthogonal axes 102-104 are illustrated with respect to vehicle 100. A roll axis 102 is defined through a long axis of vehicle 100, a pitch axis 103 is defined along a set of solar panels on vehicle 100, and yaw axis 104 is orthogonal to roll axis 102 and pitch axis 103. Although a particular orientation of axes 102-104 is illustrated in FIG. 1, the orientation is arbitrary and merely exists for purposes of discussion.

An attitude and/or a position of vehicle 100 is defined by a relation between axes 102-104 and an external reference frame. For instance, if vehicle 100 is in orbit around the Earth, then the external reference frame may be an Earth-Centered Inertial (ECI) frame, an Earth-Centered, Earth-Fixed (ECEF) frame, etc. ECI frames have their origin at the center of mass of the Earth. ECEF frames rotate in inertial space in order to remain fixed with respect to the surface of the Earth. In this embodiment, vehicle 100 utilizes IMU data to monitor velocity, orientation, and gravitational forces using a combination of accelerometers, gyroscopes, and/or magnetometers in order to determine how axes 102-104 on vehicle 100 change over time with respect to an external reference frame.

Figure 2:
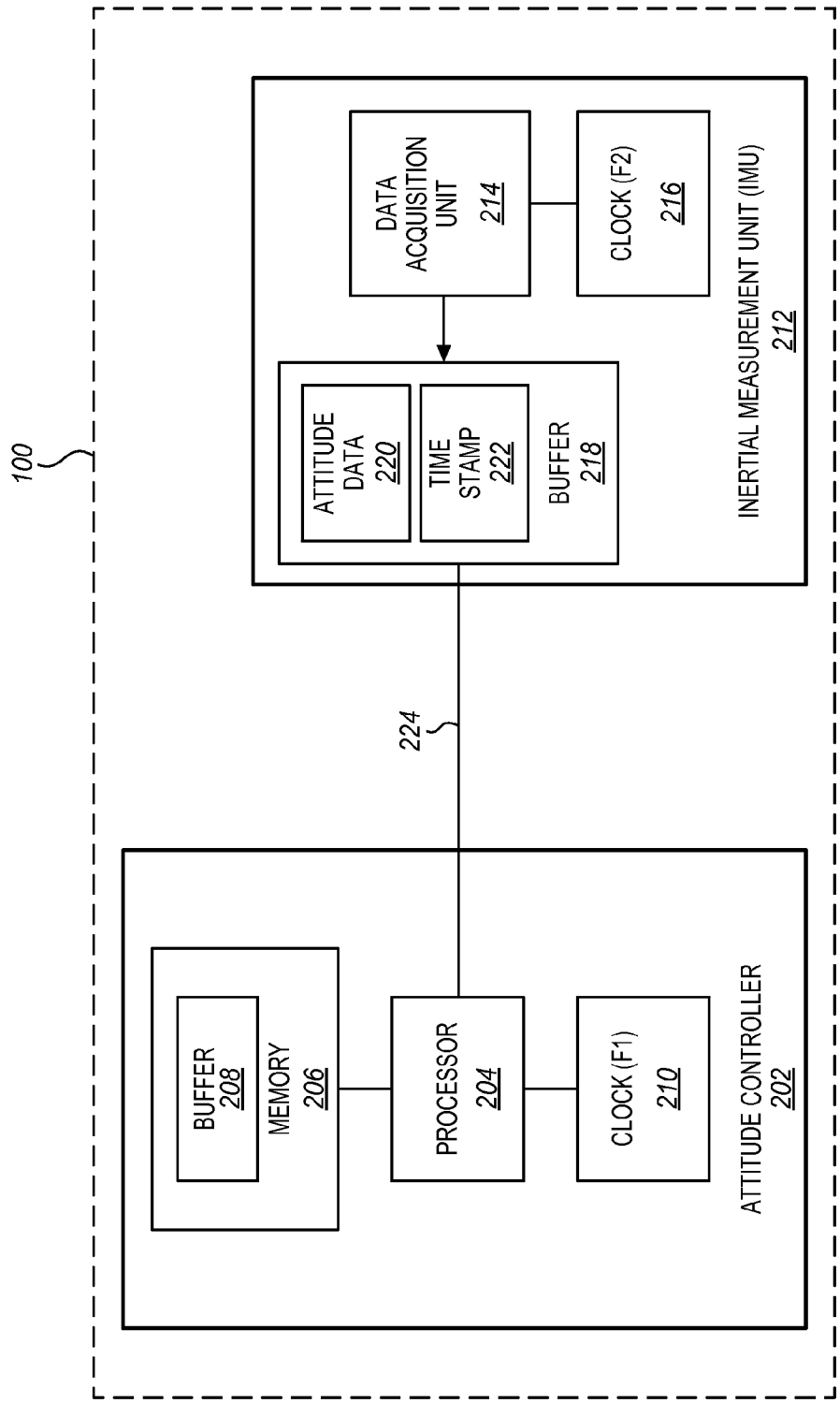
FIG. 2 is a block diagram of an attitude controller for passive timing of asynchronous IMU attitude data in an exemplary embodiment.

FIG. 2 is a block diagram of an attitude controller 202 for passive timing of asynchronous IMU attitude data 220 in an exemplary embodiment. Attitude controller 202 samples attitude data 220 generated by IMU 212 over bus 224. In the embodiments described herein, attitude controller 202 is able to more accurately estimate the lag times between updates of attitude data 220 and samples of attitude data 220 using information derived from the pattern of skipped and duplicate samples of attitude data 220, along with the relationship between F1, which is the sampling frequency of attitude data 220, and F2, which is the update frequency of attitude data 220. Attitude controller 202 performs the estimations passively, without resorting to broadcast messages or other active synchronization mechanisms over bus 224. Using these techniques, attitude controller 202 is capable of reducing the estimated lag times for attitude data 220 to values that are far below the average lag values based on F1 or F2 alone.

In this embodiment, attitude controller 202 includes a processor 204, memory 206, and a buffer 208 stored in memory 206. Processor 204 generates samples of attitude data 220 based on a clock 210, which operates at a frequency F1. Samples of attitude data 220 captured by processor 204 may be stored in buffer 208 of attitude controller 202 for lag estimate processing. Processor 204 also captures a timestamp 222 that is associated with attitude data 220. Timestamp 222 may be a counter that is updated by IMU 212 when attitude data 220 is updated by IMU 212. For instance, timestamp 222 may be a 16 bit counter value that increments by one each time IMU 212 updates buffer 218 with new attitude data 220. Timestamp 222 may also have a finer granularity than the update period. For example, timestamp 222 might nominally update by 2,500 counts each time IMU 212 updates buffer 218 with new attitude data 220. Timestamp 222 allows attitude controller 202 to determine if a particular sample of attitude data 220 is a duplicate sample or a missed sample. This will be discussed in more detail later.

In this embodiment, IMU 212 includes a data acquisition unit 214, which updates buffer 218 with new attitude data 220 and a new timestamp 222 based on a clock 216. Clock 216 operates at a frequency F2, which may be faster or slower than F1. For instance, F2 may be about 200 Hz, with F1 being about 122.07 Hz. In this case, data acquisition unit 214 updates attitude data 220 every 5 milliseconds (ms) and processor 204 of attitude controller samples attitude data 220 every 8.192 ms. In FIG. 2, processor 204 samples attitude data 220 over bus 224. Bus 224 may be an asynchronous bus in some embodiments. One example of an asynchronous bus 224 is a Mil-STD 1553 data bus, used in a variety of vehicles that utilizes Inertial Measurement Units.

In this embodiment, IMU 212 generates attitude data 220 regarding the velocity, orientation, and gravitational forces that vehicle 100 is subject to using a combination of accelerometers, gyroscopes, magnetometers, etc., which are not shown in FIG. 2. For instance, attitude data 220 may record changes of vehicle 100 along roll axis 102 with respect to the external reference frame, changes of vehicle 100 along pitch axis 103 with respect to the external reference frame, changes in vehicle 100 along yaw axis 104 with respect to the external reference frame, etc. Attitude controller 202 asynchronously samples buffer 218 at the frequency F1 to capture both attitude data 220 and timestamp 222, while IMU 212 asynchronously updates both attitude data 220 and timestamp 222 at the frequency F2. Because the sampling process and the updating process are asynchronous with respect to each other, a lag time between when IMU 212 updates attitude data 220 and when attitude controller 202 samples attitude data 220 varies over time. This is more clearly illustrated in FIG. 3, which is a timing diagram illustrating "sample walk" in an exemplary embodiment.

Figure 3:
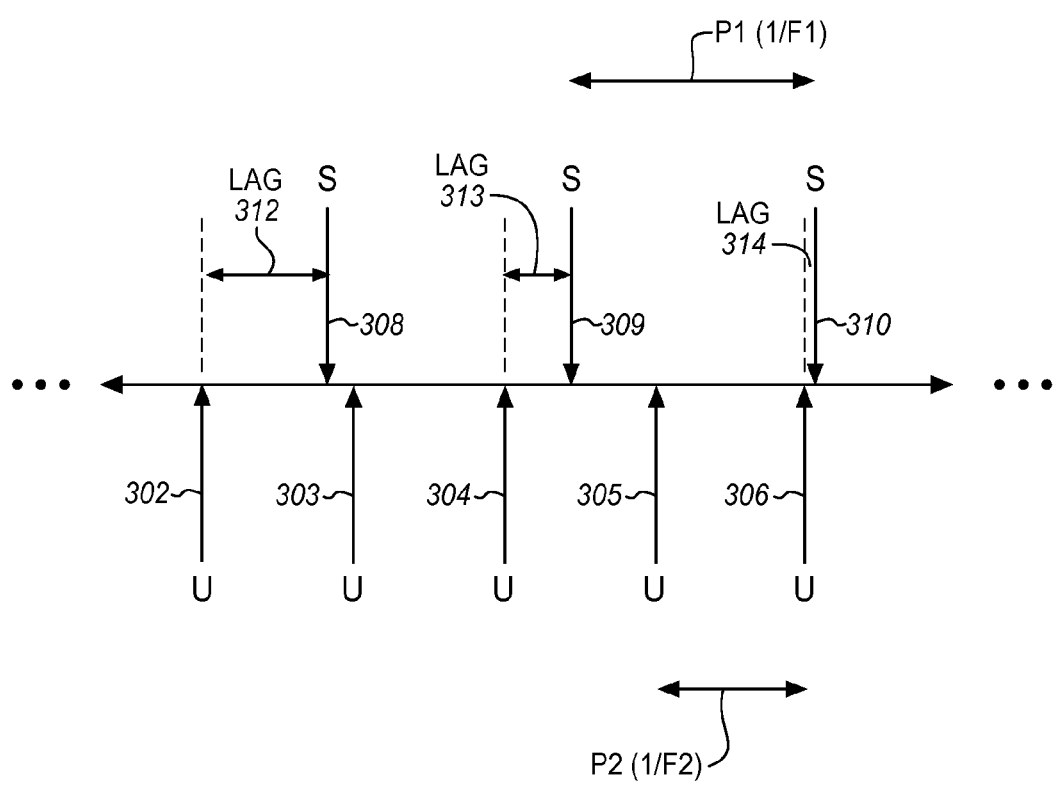
FIG. 3 is a timing diagram illustrating "sample walk" in an exemplary embodiment.

In FIG. 3, updates 302-306 of attitude data 220 by IMU 212 occur at a period P2, which is 1/F2, while samples 308-310 of attitude data 220 by attitude controller 202 occur at a period P1, which is 1/F1. Because the sampling process and the updating process are asynchronous, samples 308-310 "walk" with respect to updates 302-306. The result is that the lag varies between the moment in time when a particular update to attitude data 220 is made by IMU 212, and the moment in time when attitude controller 202 samples attitude data 220. This is illustrated as different lag times 312-314 that occur between updates 302-306 of attitude data 220 and samples 308-310 of attitude data 220. The lag time is periodic and bounded by the update rate of IMU 212. For instance, if IMU 212 updates attitude data 220 every 5 ms, then the possible range of lag times for any particular sample captured by attitude controller 202 is 0-5 ms. The result is that any particular sample of attitude data 220 may be within 0-5 ms of being "old", with the mean lag in this example being 2.5 ms+/−2.5 ms. However, there are some cases where even a 2.5 ms uncertainty in the lag time between when attitude data 220 is updated and when attitude controller 202 captures a sample of the update is not acceptable.

While it may be possible in some cases to sample attitude data 220 at a high rate and attempt to reduce the lag time, this is not always possible. For instance, bus 224 which is used by attitude controller 202 to sample attitude data 220 in FIG. 2, may be shared by a variety of other sensors and devices onboard vehicle 100. Thus, it may not be possible to dedicate enough bandwidth on bus 224 for attitude controller 202 to sample attitude data 220 at a high rate. Further, in cases where attitude controller 202 is performing other tasks for controlling vehicle 100, there simply may not be enough additional bandwidth on processor 204 to sample attitude data 220 at a high rate.

Figure 4:
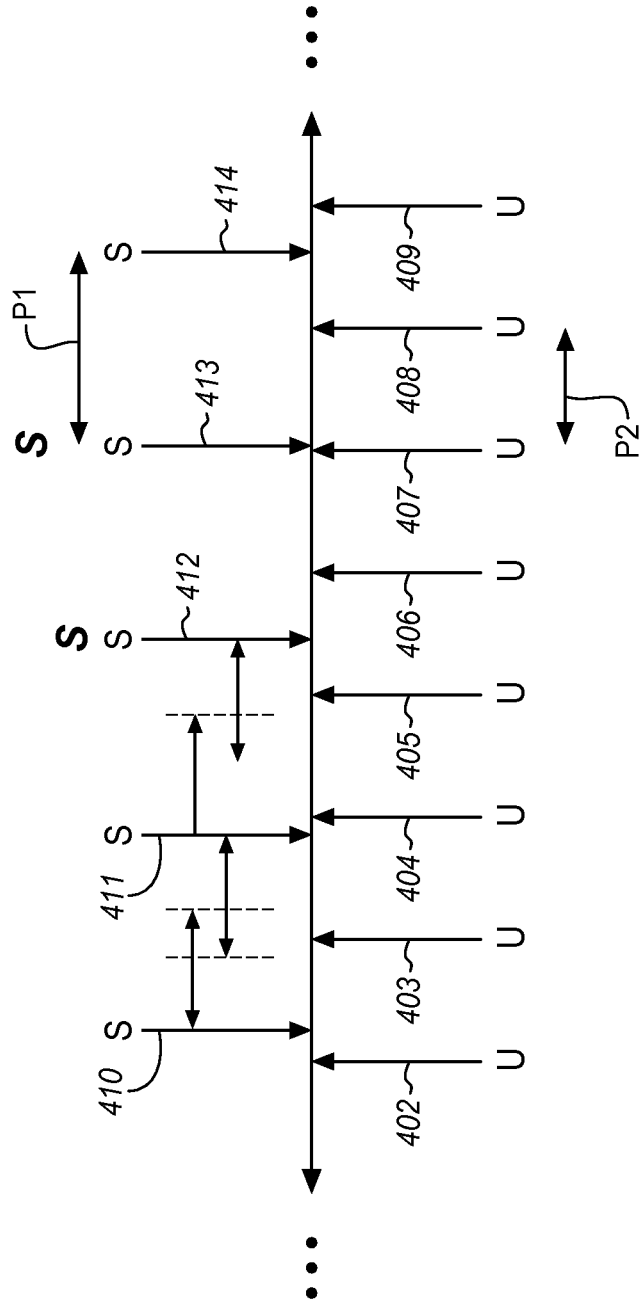
FIG. 4 is a timing diagram illustrating skipped samples of updates to IMU attitude data in an exemplary embodiment.

FIG. 4 is a timing diagram illustrating skipped samples of updates to IMU attitude data in an exemplary embodiment. In this embodiment, samples 410-414 and updates 402-409 occur asynchronously at different rates. This may occur, for example, when clock 210 and clock 216 are not synchronized (see FIG. 1). In particular, samples 410-414 occur at a period P1 that is longer than a period P2 of updates 402-409. Due to the asynchronous nature of the sample/update process, this causes samples to "walk" with respect to updates to attitude data 220. For instance, sample 410 occurs closer to update 402 than sample 411 occurs to update 403. In cases where P1>P2, such as in FIG. 4, some updates to attitude data 220 will be missed. This is illustrated as skipped samples "S" in FIG. 4. A skipped sample occurs when multiple updates to attitude data 220 occur within one sampling period. For instance, updates 404-405 occur between samples 411-412, with update 404 being missed by attitude controller 202.

Attitude controller 202 is able to identify a skipped sample of an update by analyzing timestamp 222, which is updated by IMU 212 when attitude data 220 is updated. For instance, if timestamp 222 increments by one count value each time an update is performed, then attitude controller 202 may compare the current timestamp associated with a sample with the previous sample. If the difference is more than one count value, then an update was missed. If the difference is one count value, then the update was not missed. In cases where P1<P2, duplicate samples may be captured. In this case, attitude controller 202 samples the same attitude data 220 twice. This will be discussed later with respect to FIG. 5.

Attitude controller 202 is able to more accurately estimate the lag time between samples 410-414 and updates 402-409 using a number of different approaches, including a filtering approach, an "upper-lower bound" approach, and a "magic sample" approach. The filtering approach will be discussed first, for the cases whereby P1=8.192 ms and P2=5 ms in FIG. 4, and whereby P1=5 ms and P2=8.192 ms in FIG. 5, with the values chosen simply for purposes of discussion. As discussed later, it is important that P1 and P2 are distinct, and it is beneficial that the absolute value of the difference between P1 and P2 be greater than their greatest common divisor.

From a filtering point of view of the problem of passively estimating the lag time, the possible lag time between samples 410-414 and updates 402-409 may be modeled as a uniform probability distribution with a mean of 2.5 ms and an amplitude of +/−2.5 ms. In this case, the variance of a uniform distribution is $\frac{1}{3}*(r^2)$, or $\frac{1}{3}*2.5\ ms^2$ when P2 is 5 ms. However, this estimate of the lag time can be improved by analyzing whether or not a skipped sample of an update to attitude data 220 occurred.

The first case to consider is when an update to attitude data 220 is not skipped. One example of this is sample 411, which captured update 403 in FIG. 4. In continuing with the 5 ms update period example (e.g. P2 in FIG. 4 is 5 ms), it can be determined that update 403 occurred within 5 ms of sample 411 and within 5 ms of sample 410. This information can be used along with the sampling period P1 to determine that an overlap occurs between the two conditions, which are illustrated as dashed lines between samples 410-411. If, for instance, P1 is 8.192 ms, then this overlap further bounds the possible lag time of update 403 with respect to sample 411 as between 3.192 ms-5 ms. Using this new information, the mean lag when a sample is not missed (as per the example P1=8.192 ms and P2=5 ms) is 4.096 ms+/−0.904 ms. This results in a variance of $\frac{1}{3}*0.904\ ms^2$. In this case, the lag time is more closely modeled using information about updates that are not missed (e.g., 4.096 ms mean lag+/− 0.904 ms variation) as compared to not using the missed update information (e.g., 2.5 ms mean lag+/−2.5 ms variation). This information is used as an input to a low pass filter (e.g., a moving average filter) in order to estimate the lag time. In the filter approach, the input to the filter is the sample-by-sample estimates for the lag time.

The next case to consider is when a sample of an update to attitude data 220 is skipped. One example of this is sample 412, which skipped update 404 and instead captured update 405. In continuing with the 5 ms update period example (e.g. P2 in FIG. 4 is 5 ms), it can be determined that update 405 occurred at least 5 ms after sample 411 due to the miss and within 5 ms of sample 412. This information can be used along with the sampling period P1 to determine that sample 405 occurred within 0-3.192 ms of sample 412. Using this new information, it can be determined that the mean lag when a sample is missed (as per the example P1=8.192 ms and P2=5 ms) is 1.596 ms+/−1.596 ms. This results in a variance of ⅓*1.596 ms^2. In this case, the lag time is more closely modeled using information about updates that are missed (e.g., 1.596 ms mean lag+/−1.596 ms variation) as compared to not using the missed update information (e.g., 2.5 ms mean lag+/−2.5 ms variation). This information is used as an input to a low pass filter (e.g., a moving average filter) in order to estimate the lag time on a sample-by-sample basis.

Over time, the pattern of skip/no skip information is used as an input to the low pass filter. The no skip case results in the low pass filter receiving an input of 4.096 ms+/−0.904 ms. The skip case results in the low pass filter receiving an input of 1.596 ms+/−1.596 ms, with the output of the filter being the estimated lag time on a sample-by-sample basis. Using the filter approach, the estimate lag time can be approximated to within half the greatest common divisor of P1 and P2, as will be shown later. For instance, with P1=8.192 ms and P2=5 ms, the greatest common divisor of P1 and P2 is 8 microseconds, so the lag time can be estimated to within +/−4 microseconds. This value is much smaller than the 2.5 ms value that can be derived from P2 alone.

The performance of the low pass filter may be improved by using a moving average filter whose duration is a multiple of the least common multiple of P1 and P2, since the lag time is periodic with a period equal to the least common multiple of P1 and P2, and a moving average filter will eliminate all noise that is periodic at its duration.

Figure 5:
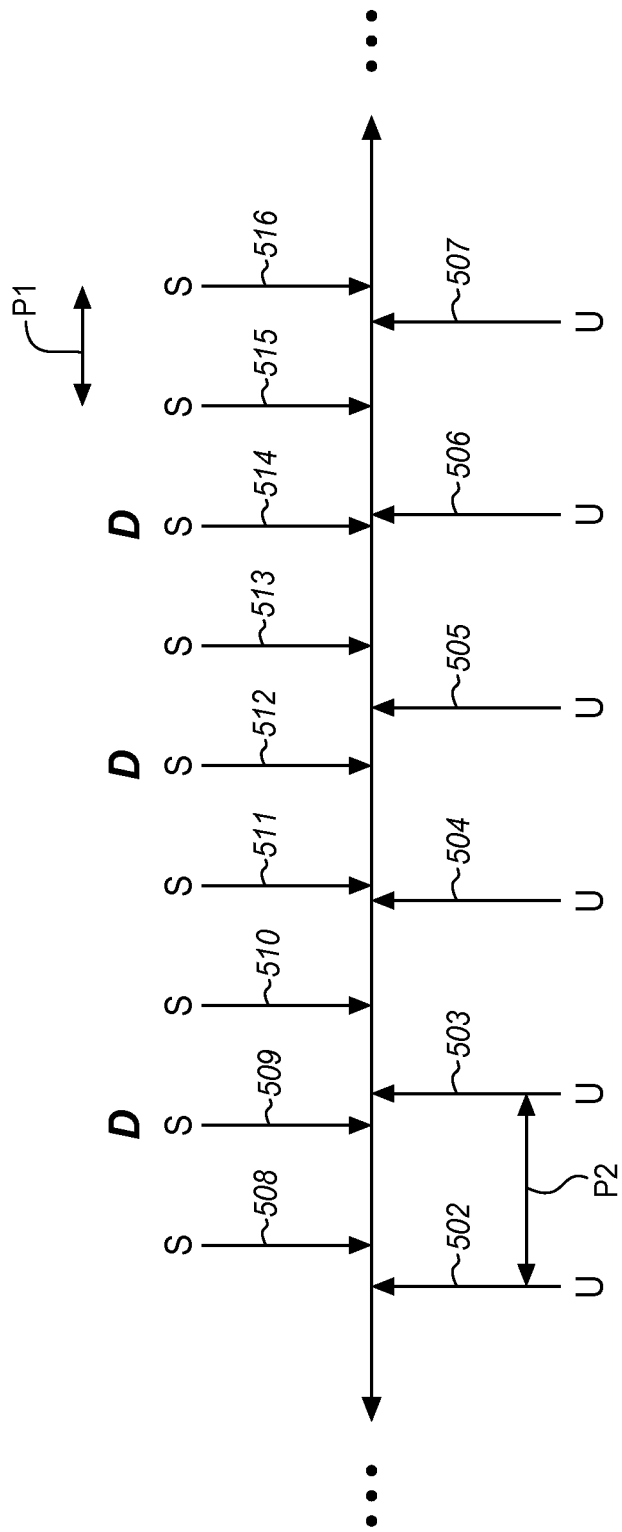
FIG. 5 is a timing diagram illustrating duplicate samples of updates to IMU attitude data in an exemplary embodiment.

The next case to consider for the filtering approach is when P1<P2, which results in duplicate samples of updates to attitude data 220. FIG. 5 is a timing diagram illustrating duplicate samples of updates to IMU attitude data in an exemplary embodiment. In this embodiment, samples 508-516 and updates 502-507 occur asynchronously at different rates. This may occur, for example, when clock 210 and clock 216 are not synchronized (see FIG. 1). In particular, samples 508-516 have a period P1 that is shorter than a period P2 of updates 502-507. Generally, the asynchronous nature of the sampling/update process causes samples to "walk" with respect to updates to attitude data 220. For instance, sample 511 occurs closer to update 504 than sample 515 occurs to update 506. In cases where P1<P2, (e.g., P1=5 ms and P2=8.192 ms) such as in FIG. 5, some updates to attitude data 220 are sampled twice. This is illustrated as duplicate samples "D" in FIG. 5. A duplicate sample occurs when two samples of attitude data 220 occur within one update period for attitude data 220. For instance, samples 508-509 will record the same update 502.

Generally, attitude controller 202 is able to identify a duplicate sample of an update by analyzing timestamp 222, which is updated by IMU 212 when attitude data 220 is updated. For instance, if timestamp 222 increments by one count value each time an update is performed, then attitude controller 202 may compare the current timestamp associated with a sample with the previous sample. If there is no difference, then the sample is a duplicate. If the difference is one count value (or higher), then the sample is not a duplicate.

From a filtering point of view of the problem of passively estimating the time lag, the possible range of lag time between samples 508-516 and updates 502-507 may be modeled as a uniform probability distribution with a mean of 4.096 ms and an amplitude of +/−4.096 ms. In this case the variance of a uniform distribution is ⅓*(r^2), or ⅓*4.096 ms^2 when P2 is 8.192 ms. However, this estimate of the lag time can be improved by analyzing whether or not a duplicate sample of an update to attitude data 220 occurred.

The first case to consider is when an update to attitude data 220 is not a duplicate. One example of this is sample 510, which captured update 503 in FIG. 5. Since sample 510 is not a duplicate of sample 509, update 503 must have occurred after sample 509, which bounds the possible lag time of update 503 with respect to sample 510 as between 0 ms-5 ms. Continuing with the 5 ms sample example (e.g., P1 in FIG. 5 is 5 ms), from this reasoning, the mean lag when a sample is not a duplicate (as per the example P1=5 ms and P2=8.192 ms) is 2.5 ms+/−2.5 ms. This results in a variance of ½*2.5 ms^2. In this case, the lag time is more closely modeled using information about updates that are not duplicates (e.g., 2.5 ms mean lag+/−2.5 ms) as compared to not making use of that information (e.g., 4.096 ms+/−4.096 ms variation). This information is used as an input to a low pass filter (e.g., a moving average filter) in order to estimate the lag time. In the filter approach, the input to the filter is the sample-by-sample estimates for the lag time.

The next case to consider is when a sample of an update to attitude data is a duplicate. One example of this is sample 509, which receives update 502, which was also received by prior sample 508. In this case, since we know the information from update 502 has already been used, we simply make no further use of update 502—samples of updates that are duplicates are not used as input to the low pass filter (e.g., a moving average filter) which estimates the lag time on a sample-by-sample basis.

Over time, the pattern of duplicate/no duplicate information is used as an input to the low pass filter. The no duplicates case results in the low pass filter receiving an input of 2.5 ms+/−2.5 ms. The duplicate case does not result in an update to the low pass filter. Using the filter approach, with a moving average filter whose duration is the least common multiple of P1 or P2, or a multiple thereof, we show below that the lag time can be estimated to within half the greatest common divisor of P1 and P2. In the example where P1=5 ms, and P2=8.192 ms, the greatest common divisor of P1 and P2 is 8 microseconds, so the lag time can be estimated to within about 4 microseconds. This value is much smaller than the +/−2.5 ms variation that can be determined from a single sample.

As discussed below, a moving average filter whose duration is the least common multiple of P1 and P2 is advantageous because the pattern of the time lag between the sample and the update is periodic with a period equal to the least common multiple of P1 and P2, and a moving average filter returns the mean value for any periodic disturbance whose duration is the duration of the moving average. Its transfer function has a first-order zero at the frequency whose period is the duration of the moving average, and at the frequencies that are positive integer multiples of that frequency.

Uncertainty in the precise values of P1 and P2 cause uncertainty in their least common multiple, allowing some of the periodic noise to pass the filter. One method of reducing the impact of that uncertainty is to cascade several moving average filters in series—by using two moving average filters whose duration is the estimated least common multiple, a second order zero is created at the frequency whose period is that duration of the moving average. Three such filters in series create third order zeros, etc. This reduces the noise transmission for frequencies near, but not at, the zeros.

Also, the least common multiple of P1 and P2 may be long. A less accurate estimate of the offset between the updating clock and the sampling clock may be obtained by using a moving average filter whose duration is a period that is close to being a common multiple of P1 and P2. Such durations are called "magic patterns", below. Such filters can be cascaded with themselves, as suggested above, with each other, and with moving average filters whose duration is the least common multiple of P1 and P2. As each filter in turn has processed the total number of samples it averages, its output is a useful estimate of the mean offset between the updating clock and the sampling clock.

Figure 6:
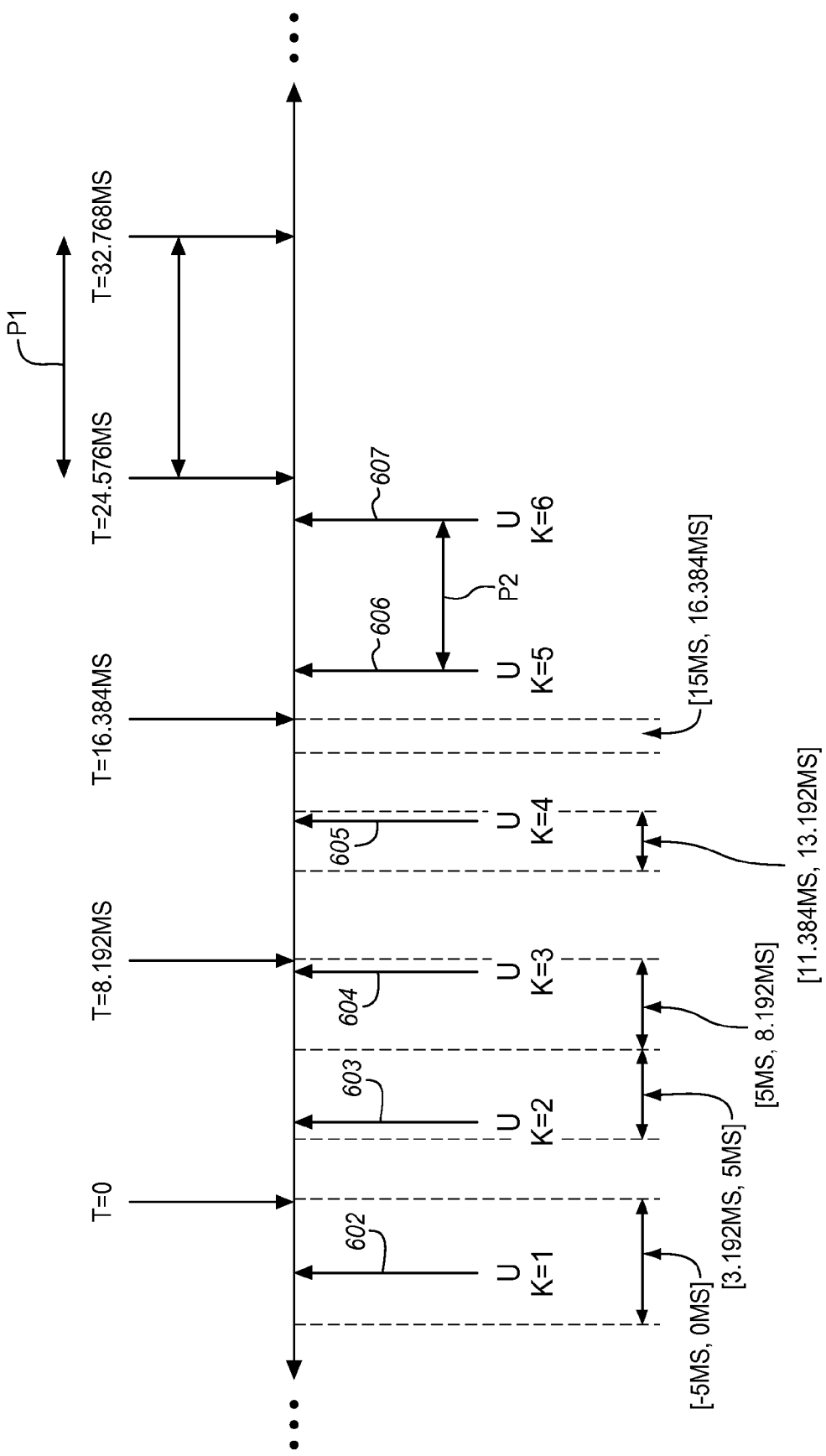
FIG. 6 is a timing diagram illustrating a number of updates, samples, and lag estimates used for an upper-lower bound algorithm in an exemplary embodiment.

The "upper-lower bound" approach will be discussed next with an example update time (P2) of 5 ms and an example sample time (P1) of 8.192 ms. FIG. 6 is a timing diagram illustrating a number of updates, samples, and lag estimates used for an upper-lower bound algorithm in an exemplary embodiment. In this approach, the first update (k=1) is sampled at t=0. The lower bound of lag time on update k=1 is −5 ms and the upper bound of lag time is 0 ms. In short form, t(k=1) has a range of lag time of [−5 ms, 0 ms]. An initial lag time estimate for t(k=1) is −2.5 ms with a range of variation of +/−2.5 ms. Since attitude data 220 is updated every 5 ms in this example, t(k=2) has a range of lag time of [0, 5 ms], t(k=3) has a range of lag time of [5 ms, 10 ms], t(k=4) has a range of lag time of [10 ms, 15 ms], and t(k=5) has a range of lag time of [15 ms, 20 ms].

The next sample is taken at t=8.192 ms. With a sample taken at 8.192 ms, the lower bound on the sample update time is 8.192 ms−5 ms=3.192 ms. The upper bound on the sample update time is 8.192 ms. So, the t=8.192 ms sample has a range of lag time of [3.192 ms, 8.192 ms]. But, based on the information above, this sample may be k=2 (update 603) or k=3 (update 604). If the t=8.192 ms sample is k=2, two pieces of information are known: t(k=2) has a range of lag time of [0 ms, 5 ms] from the t=0 ms sample, and t(k=2) has a range of lag time of [3.192 ms, 8.192 ms] from the t=8.192 ms sample. Since both the interval determined from the t=0 sample and that from the t=8.192 sample are true, the sampled update must lie in the intersection of the two intervals. So t(k=2) has a range of lag time of [3.192 ms, 5 ms], t(k=3) has a range of lag time of [8.192 ms, 10 ms], t(k=4) has a range of lag time of [13.192 ms, 15 ms], and t(k=5) has a range of lag time of [18.192 ms, 20 ms], which reduces the uncertainty from +/−2.5 ms to +/−0.904 ms. The other possible case is that the t=8 ms sample is k=3. In that case two pieces of information are known: t(k=3) has a range of lag time of [5 ms, 10 ms] from the t=0 ms sample, and t(k=3) has a range of lag time of [3.192 ms, 8.192 ms] from the t=8.192 ms sample. Both are true, so t(k=3) has a range of lag time of [5 ms, 8.192 ms], t(k=4) has a range of lag time of [10 ms, 13.192 ms], and t(k=5) has a range of lag time of [15 ms, 18.192 ms], which reduces the uncertainty from +/−2.5 ms to +/−1.596 ms. FIG. 6 illustrates the case where the t=8.192 ms sample is update 604 rather than update 603. Therefore, the t=8.192 ms sample has a range of lag time of [5 ms, 8.192 ms].

The next sample is taken at t=16.384 ms. With a sample taken at 16.384 ms, the lower bound on the update time is 16.384 ms−5 ms=11.384 ms. The upper bound on the sample update time is 16.384 ms. So, the t=16.384 ms sample has a range of lag time of [11.384 ms, 16.384 ms]. But, based on the information above, this update may be k=4 or k=5. Since the update at t=8 ms could have been k=2 or k=3, there are four possible cases.

In the first case, the sample at t=16.384 ms is k=4, and the sample at t=8.192 msec was k=2. Taking the intersection of the interval determined above for k=4 from case where the t=8.192 msec sample was k=2, [13.192 ms, 15 ms], and the interval for the t=16.384 ms sample, [11.384 ms, 16.384 ms], the k=4 sample in this case lies in [13.192 ms, 15 ms]. So, for the first case, the uncertainty remains at +/−0.904 msec—the update at t=16.384 seconds does not reduce the uncertainty in the first case.

In the second case, the sample at t=16.384 ms is k=4, and the sample at t=8.192 msec was k=3. Taking the intersection of the interval determined above for k=4 from case where the t=8.192 msec sample was k=3, [10 ms, 13.192 ms], and the interval for the t=16.384 ms sample, [11.384 ms, 16.384 ms], the k=4 sample in this case lies in [11.384 ms, 13.192 ms]. So, for the second case, the uncertainty range on the k=4 sample is reduced from +/−1.596 ms to +/−0.904 ms.

In the third case, the sample at t=16.384 ms is k=5, and the sample at t=8.192 msec was k=2. Taking the intersection of the interval determined above for k=5 from case where the t=8.192 msec sample was k=2, [18.192 ms, 20 ms], and the interval for the t=16.384 ms sample, [11.384 ms, 16.384 ms], the intersection is the null set, so case 3 is not possible.

In the fourth case, the sample at t=16.384 ms is k=5, and the sample at t=8.192 msec was k=3. Taking the intersection of the interval determined above for k=5 from the case where the t=8.192 msec sample was k=3, [15 ms, 18.192 ms, and the interval for the t=16.384 ms sample, [11.384 ms, 16.384 ms], the k=4 sample in this case lies in [15 ms, 18.192 ms]. So, for the fourth case, the uncertainty range on the k=5 sample is reduced from +/−1.596 ms to +/−0.904 ms. A similar analysis can be applied for the converse case of P1>P2.

Thus, when P1=8.192 ms and P2=5 ms, the upper-lower bound algorithm reduces the timing uncertainty of the sample from +/−2.5 to 0.904 ms within 3 samples (16.384 ms). As discussed below, once the number of samples processed reaches the least common multiple of P1 and P2, the remaining range of uncertainty will be the greatest common divisor of P1 and P2. In the case where P1=8.192 ms and P2=5 msec, the least common multiple is 5.12 seconds and the greatest common divisor is 8 microseconds, so the upper-lower bound method will reduce the uncertainty in the lag to +/−4 microseconds in 5.12 seconds.

While the upper-lower bound algorithm was illustrated with multiple cases above for exposition, an implementation need only consider the case set before it. At each step, the upper-lower bound algorithm determines the sample number of the current sampled update, and determines the propagation time from the prior sampled update to the current sampled update by multiplying the difference of the current update number and the prior update number by P2. It then calculates the propagated lag time bounds for the current sampled update by adding the propagation time to both the lower time lag bound and the upper time lag bound of the prior sampled update. It then calculates the measured lag time bounds. The lower measured lag time bound is the sample time minus the smaller of P1 and P2. The upper measured lag time bound is the sample time. The algorithm them takes the intersection of the propagated lag time bounds and the measured lag time bounds to arrive at the lag time bounds for the current sample.

In practical application, there will be uncertainties on the sample times, and on the values of P1 and P2. This can be dealt with by two means—accounting for the uncertainties, and measuring P1 and P2 to reduce the uncertainties.

To account for the uncertainties when the measured lag time bounds are calculated, the lower measured lag time bound is not simply the nominal sample time minus the minimum of P1 and P2, but the nominal sample time minus the uncertainty in the sample time, minus the minimum of the upper bound on P1 and the upper bound on P2. For example, if the timing uncertainty is 4 microseconds, and the uncertainty on P1 and P2 were each 8 microseconds, the lower measured lag time bound would be the sample time minus the smaller of P1 and P2 minus 12 microseconds. Similarly, the measured lag time upper bound would be the sample time plus 4 microseconds. When the lag time bounds are propagated, the propagation time for the lower bound would be the difference of the current update number and the prior update number by P2 minus 8 microseconds, and the propagation time for the upper bound would be P2 plus 8 microseconds. While this addresses the issue of uncertainty in the sample time, P1 and P2, these uncertainties still increase the uncertainty in the time tag.

There are various means to reduce the sample time uncertainties, allowing the uncertainty in the time tag to be reduced. One commonly available method for reducing the uncertainty in the sample time is to sample a high speed clock to determine the time of the sample, rather than assuming that the current sample time is simply the prior sample time plus P1. In this case, when calculating the lower measured lag time bound, the difference between the high speed clock value at the current sample, minus the high speed clock value at the prior sample, is used in place of P1.

The uncertainty on P2 can be reduced by measuring it. One way is to record the sample number and lag time uncertainty upper and lower bounds for one sample, and compare them with a later sample. The average value of P2 and its uncertainty is then computed by dividing the difference in time by the difference in sample number. For the case of P1=8.192 ms and P2=5 ms, we have shown that the time lag uncertainty can be reduced to less than 1 millisecond in a fraction of a second, and even with this relatively large uncertainty, comparing using samples 200 seconds apart will measure the average value of P2 to 10 parts per million, even if the initial uncertainty on P2 is as large as 1000 parts per million. As the uncertainty in P2 is reduced, the time tag uncertainty is reduced, allowing P2 to be measured to a given accuracy with shorter time spans, which in turn helps mitigate the issue that the value of P2 is likely to vary with time due to temperature variations, etc.

In some applications, it is acceptable to determine the update time lags after the fact, rather than in real time. In this case, information from samples after the sample that received a given update can be used to more accurately determine the time lag of a sample, by such means as running the algorithm both forward in time and backward in time and averaging the results. The resultant averaged values of P2 as a function of time can then be used as a starting point for a subsequent iteration to refine the measurements.

The "magic sample" approach will be discussed next. In this approach, attitude controller 202 analyzes a pattern of skipped or duplicate samples of attitude data 220 over time. Each time attitude controller 202 samples attitude data 220, attitude controller 202 analyzes timestamp 222 and compares it to the timestamp information from the previous sample and determines how many updates have occurred since the last sample. For instance, if no updates have occurred, the timestamps will be identical. If one update has occurred, then the timestamps will be different by a corresponding update rate for timestamp 222 (e.g., a difference of 1 when timestamp 222 increments by one value each time an update occurs). If two updates have occurred, then the difference is 2.

Figure 7:
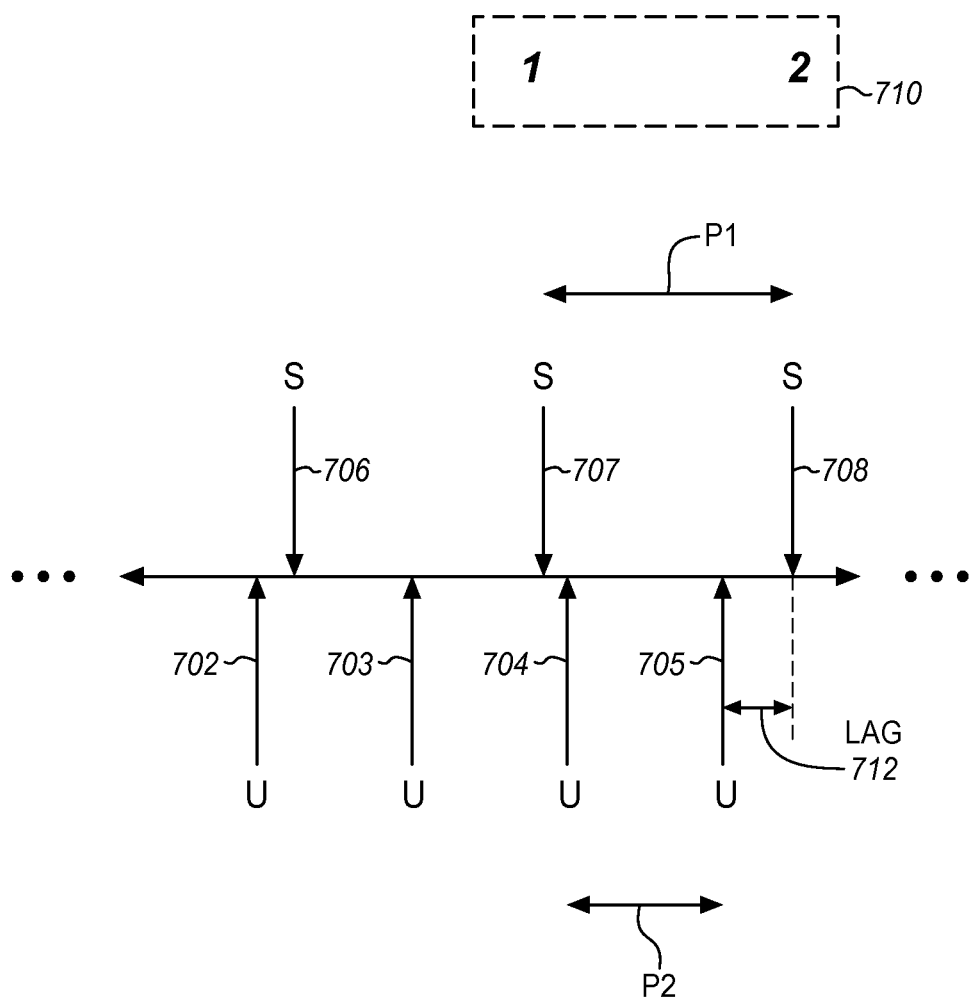
FIG. 7 is a timing diagram illustrating a number of updates, samples, and a corresponding pattern used for a pattern matching algorithm in an exemplary embodiment.

FIG. 7 is a timing diagram illustrating a number of updates, samples, and a corresponding pattern used for a pattern matching algorithm in an exemplary embodiment. FIG. 7 illustrates a number of updates 702-705, samples 706-708, and a corresponding pattern 710. In FIG. 7, P1<P2, although a similar analysis will apply when P1>P2. In this embodiment, pattern 710 is generated on a sample-by-sample basis depending on how many updates have occurred since the previous sample. If the sum is equal to the number of expected updates that corresponds to the time period over N entries, then the time lag of the last sample in the sum can be estimated with greater precision. For example, if P1=8.192 ms and P2=5 ms, then over 16.384 ms, three updates will have occurred (e.g., 5 ms updates fits 3 times into 16.384 ms), which places the maximum lag 712 at ((2*8.192 ms)−(3*5 ms)=1.384 ms, with an average lag of half of that. When N is increased, the lag time decreases. For instance, if N=47, then the maximum lag falls to 24 microseconds (47*8.192 ms)−(77*5 ms)=24 microseconds. In this case, attitude controller 202 generates a moving sum of 47 samples and looks for the pre-defined value 77. When the value of 77 is found, this indicates that the maximum lag of the last sample is within 24 microseconds. A similar analysis can be applied to the corresponding case when P1<P2.

Using passive timing, attitude controller 202 is able to more accurately estimate the lag times for samples of IMU attitude data by analyzing the pattern of skipped and duplicate samples. This activity is performed without an active synchronization process (e.g., using broadcast synchronization messages, which may not be possible or desirable). Further, the passive timing techniques described herein allow for a more accurate estimate of the lag time between updates to attitude data 220 and samples of the attitude data. With a more accurate estimate of lag time for attitude data generated by an IMU, it is possible to provide more a more accurate inertial position of a vehicle. Further, it is possible to more accurately correlate IMU attitude data with other positional sources on the vehicle, such as star trackers.

Examples

A register sampled at a (nominal) frequency f1 determined by a first oscillator is updated at a (nominal) frequency f2 by a second oscillator. The sampled register data contains information sufficient to determine the number of register updates which have occurred since the prior sample. The goal is to determine the phase of the first oscillator relative to the second oscillator by passively observing the sampled register values.

To understand the design, implementation and performance of the embodiments described herein, consider a simplified version of the problem using number theory and modulo arithmetic. In the simplified problem, f1 and f2 are finite, nonzero, perfectly regular, and their ratio is a constant, rational number. Furthermore, if the register is updated and sampled at the same instant, then the sampled registered value receives that update value.

In this simplified version of the problem, the register sample time history is periodic with a period equal to the least common multiple (LCM) of 1/f1 and 1/f2, and invariant over intervals of time offset between the oscillators whose width is the greatest common divisor (GCD) of 1/f1 and 1/f2. Further, the sample time history must change if the offset between the oscillators is changed by more than the GCD of 1/f1 and 1/f2. This sets both a lower and an upper bound on the accuracy with which the offset between the two oscillators can be determined from the number of observed updates between samples alone in the simplified problem.

Furthermore, if the difference between 1/f1 and N/f2 is the GCD of 1/f1 and N/f2, then the only sample in the register sample time history where the number of updates between samples is other than N occurs once per the least common multiple (LCM) of 1/f1 and 1/f2. Such systems are analogous to a Vernier scale (a direct Vernier or retrograde Vernier, depending on whether 1/f1 or N/f2 is larger).

This prior paragraph implies that if 1/f1 and N/f2 are very close, then the number of updates per sample information on the relative timing, while very tight once the informative sample arrives, comes relatively rarely. In this case, when the sampled register is initially started, or restarted in the event of a problem, a large number of updates may occur before the uncertainty range on the time offset between the two oscillators is significantly reduced below 1/f2 if the only information available on the time offset between the oscillators is the number of updates since the prior sample.

If sample frequency f1 and update frequency f2 are finite, nonzero, perfectly regular, and their ratio, f1/f2, is a constant, rational number, then we can express that rational number as Q/R, where Q and R are the smallest positive integers for which f1/f2=Q/R. Since f1/f2=Q/R, and f1, f2 and R are nonzero, Q/f1=R/f2.

T=Q/f1=R/f2 is the least common multiple (LCM) of the sample period 1/f1 the update period 1/f2. This is true because Q and R were chosen to be the smallest integers for which Q/f1=R/f2. T/(QR)=(1/f1)/R=(1/f2)/Q is the greatest common divisor (GCD) of the sample period 1/f1 and the update period 1/f2.

T/(QR) is a divisor of 1/f1 and 1/f2 since T/(QR)=(Q/f1)/(QR)=(1/f1)/R and T/(QR)=(R/f2)/(QR)=(1/f2)/Q. T/(QR) is the greatest common divisor (GCD), because if there were a greater common divisor, x, then there would exist L and M such that 1/f1=Mx, with M<R, and 1/f2=Lx, with L<Q. If this were so, then f1/f2=L/M where L<Q and M<R. Since Q and R are the smallest positive integers for which f1/f2=Q/R, however, this cannot be. Therefore, T/(QR) is the greatest common divisor of 1/f1 and 1/f2.

The lag between the update time and the sample time is periodic with a period of Q/f1=R/f2, and the values the lag takes on are R consecutive integer multiples (0 to R−1) of the greatest common divisor ((1/f1)/R) plus a fraction of the greatest common divisor. That is, the values of the lag can be expressed as k*(1/f1)/R+d, where k is an integer, 0<=k<=R−1, and d is a nonnegative real number strictly less than the GCD, 0<=d<(1/f1)/R.

If the sample and update are simultaneous at time t0, then for any integer value of k, there will be a sample at t=t0+k*Q/f1 and an update at t=t0+R/f2. Since Q/f1=R/f2=T, this means that there will be a simultaneous sample and update at every time t=t0+k*T, and the sample history will be periodic with period T.

It is helpful to describe the time lag between an update and the following sample in modulo arithmetic, using the sample period as the modulus. For each update, u(j), we express the time lag to the first sample whose time follows (or is simultaneous with) the update time in modulo arithmetic, modulo 1/f1, on the range −1/f1<u(j) (modulo 1/f1) <=0.

At t0, let j=0. Since the update time equals the sample time, u(0) (modulo 1/f1)=0. We know that this will be true again after R more updates. No intermediate update u(j), where j is a positive integer less than R, can be 0 modulo 1/f1, since that would imply that j/f2 is a common multiple of 1/f1, with j<R, but R is defined as the least common multiple of 1/f1 and 1/f2. Additionally, no intermediate update can have the same value (modulo 1/f1) as any other intermediate update, since those two points would be the endpoints of an infinitely repeating cycle (modulo 1/f1) that would not contain 0 modulo 1/f1 (from the above), and since u(R) is 0 modulo 1/f1, so no such infinite cycle can exist. The cycle would be infinite, since the result (modulo 1/f1) of any number plus 1/f2 is unique.

From the above, we see that the R samples u(1) . . . u(R) all have unique representations (modulo 1/f1). Since their sample times are all of the form t0+k(1/f1)/R, and (1/f1)/R is the GCD, they are lie on points that are multiples of (1/f1)/R. Since there is only room for R samples on points (1/f1)/R apart in the interval (1/f1), the minimum spacing between update times (modulo 1/f1) is the GCD, (1/f1)/R.

Previously described is the case where an update is coincident with a sample at t0. Because the register updates are spaced evenly, (1/f1)/R apart (modulo (1/f1)), we can shift the register update pattern backwards in time by a fraction of the GCD, d, where 0<=d<(1/f1)/R), without changing the sequence of the sampled reference values—every sample will receive exactly the same information that it did in the case where the update was coincident with a sample at t0. Therefore, in the simplified problem, the offset between the update sequence and the sample sequence cannot be resolved more accurately than an uncertainty interval of the GCD, (1/f1) from the information in the sampled register sequence alone.

The subsequent discussion will show how: (1) the use of a mechanical Vernier scale (either direct or retrograde) to measure intervals to a fraction of a scale division (2) the use of the "beat period" to detect the difference between two frequencies in acoustics, and (3) the use of detected missing/extra samples determine the true value of f1/f2 and the time lag between IMU update and sample. While each of these is analogous to our current problem, we show that, in the framework of the simplified problem, these are the special case where ||Q−R||=1. This special case has special properties not present in the general case that are used to advantage in these applications. The various embodiments we have presented above work in the general case, for any Q and R, and are not limited to cases where ||Q−R||=1 where these special properties are not present to be taken advantage of Therefore it works in cases where it is impractical to ensure that ||Q−R||=1. Furthermore, there are advantages of using values of Q and R where ||Q−R|| is larger than 1, especially some cases where ||Q−R|| is significantly larger than 1. In particular, one can guarantee that the uncertainty of the timing of updates can be significantly reduced well before the LCM of P1 and P2 is reached, as in the upper-lower bound example with P1=8.192 ms and P2=5 ms.

One property of the special case where ||Q−R||=1 is that the update period (1/f2) modulo the sample period (1/f1) is +/1 one GCD ((1/f1)/R). As a result, the time lag between each update and the successive sample is reduced/increased by (1/f1)/R, and the update point crosses the sample point once every R samples.

When ||Q−R||=1, the difference between the two sample periods is: 1/f1−1/f2=(1/f1−1/(f1(R/Q))=(1/f1)(1−Q/R)=(1/f1)(R−Q)/R. The last, when ||Q−R||=1, is +/−(1/f1)/R, which is the GCD.

In the notation of our simplified problem, the length of a mechanical Vernier scale is T, divided into Q Vernier scale divisions, where a Vernier scale division is 1/f1 in length (T=Q/f1) and the Vernier scale marks are numbered sequentially. The length of the Vernier scale, T, is chosen to be R divisions on the main scale, where a main scale division is 1/f2 in length (T=R/f2), and For a mechanical Vernier scale, Q is either R+1 (a "direct" Vernier) or R−1 (a "retrograde Vernier"). Since ||Q−R||=1, both the direct Vernier and the retrograde Vernier are examples of our special case above. For a direct Vernier scale, a common choice is R=9 and Q=10.

To use a direct Vernier scale, the first (zero) mark of the Vernier scale is placed at the position to be measured, which generally lies between two divisions on the main scale. The main scale value of the position to be measured is the main scale value of the main scale mark to the left of the position to be measured, plus the fraction of the main scale division lying between that main scale mark and zero mark of the Vernier scale. This fractional division is analogous to the time lag between our register update and our register sample. Looking at the Vernier scale marks in ascending order, the distance between each successive Vernier scale mark and the main scale mark to its immediate left is reduced, because the main scale divisions are coarser. We showed above that when Q−R=1, as it is here, is that the distance between the updates (main scale marks) and the samples (Vernier scale marks) is reduced by the GCD=(1/f2)/Q for each successive sample. When Q is 10, then, the reduction in separation between the Vernier mark and the corresponding main scale mark is reduced by 1/Q=1/10 of a main scale division (1/f2) for each ascending Vernier scale mark, so the number of the Vernier scale mark that is most closely aligned to its corresponding main scale mark is the number of tenths of a main scale division to be added to the main scale mark value to the left of the position to be measured.

The theory above illustrates the qualitative difference between the general simplified problem and the special case of $\|Q-R\|=1$ that causes Vernier scale designers to ensure that $\|Q-R\|=1$. If one constructed a mechanical Vernier scale for which $\|Q-R\|$ was not one; while one could similarly read off the position to 1/Q of a main scale by finding the Vernier scale mark most closely aligned to a main scale mark, and read off the Vernier scale number, the Vernier scale mark numbers would need to be non-sequential.

In acoustics, the beat frequency is the difference between the frequencies of two acoustic tones. In the framework of the simplified problem, the frequencies of the two acoustic tones play the role of f1 and f2, and the beat frequency is $\|f1-f2\|$. In acoustics, the beat frequency is used to measure the difference between f1 and f2, and if one is known (e.g., f1) this can be used to determine f2. The analog of the beat frequency in our simplified problem is a "generalized beat frequency"—the reciprocal of our basic period, or 1/T=f1/Q=f2/R. However, our "generalized beat frequency" may only match the acoustic beat frequency, $\|f1-f2\|$ in the special case where $\|Q-R\|=1$.

In the simplified problem, the beat frequency $\|f1-f2\|$ is: $\|f1-f2\|=\|f2*(Q/R)-f2\|=\|f2*(Q/R-1)\|=\|f2*(Q-R)/R\|$. The generalized beat frequency is f2/R. These are equal if and only if: $\|f2*(Q-R)/R\|=f2/R \Rightarrow \|(Q-R)\|/R=1/R \Rightarrow \|(Q-R)\|=1$, which is the same special case as the Vernier scale.

In practice, f1 and f2 in practice will be different than those designed, and will change over time. The sampling rates will not be perfectly regular, but are likely to include high frequency variation in the update period and sample period, known as "jitter". In addition to jitter due to oscillator effects, when the update time or sample time is under software control, much of this jitter may be due to path-dependent software execution time, including real-time interrupt handling, periodic variation in software task schedules, and finer grained effects.

The stability of f1 and f2 may be improved by the many means known in the art to improve oscillator stability. Beyond that, there are many ways to mitigate the fact that the "as-built" values of f1 and f2 will be different than the nominal values, and change with time.

The nominal values of f1 and f2 can be chosen so that system performance over the foreseeable range of variation of f1 and f2 are satisfactory. For example, it is desirable that the GCD over the range of variation is sufficiently small to meet the timing goals and that $\|(Q-R)\|>1$.

The relative range of uncertainty of f1/f2 can be reduced by measuring f1/f2 initially, periodically, or, for highest performance, continuously. The ratio f2/f1 can be measured accurately by simply counting the number of updates that occur between a sufficiently widely spaced pair of endpoint samples. This simple approach determines the average value f2/f1 over that sample interval, to an uncertainty caused by a time offset uncertainty between the endpoint samples and their corresponding updates. One way to reduce the time offset uncertainty, and hence reduce the endpoint sample spacing to measure f2/f1 to a given accuracy, is to choose endpoints where the offset between the endpoint samples and their corresponding updates is known to be very small. This may be done by choosing the "missing update" points as endpoints. However, the time offset between the endpoint samples and their corresponding updates need not be very small—it is sufficient that the uncertainty in the duration of this time offset is very small. In that case, the accurately known duration of the time offset between sample and update can be accounted for in calculating the average value of f2/f1—this known duration is used to account for the fractional update periods at the endpoints.

For example, if nominally 1/f1=8.192 ms and 1/f2=10 ms, we may determine that there were 5120.82 updates in 6250 samples. Since one goal is to determine the offset between update and sample to high accuracy, the accurate offsets can be used to advantage in measuring f2/f1, hence f1/f2. This increased knowledge accuracy in f1/f2 can be used to update the processing parameters based on f1/f2, used by various forms of the current invention, such as the 1/f2 value used to propagate the time stamp of sampled updates, the moving average filter width, and the "magic patterns". This will improve the accuracy in measuring f1/f2, repeating the cycle.

One mitigation for sample time jitter in systems where the update time is recorded by reading the first oscillator time is to use this measured sample time rather than assuming a fixed (or slowly varying) value for 1/f1. Update time jitter may be similarly mitigated in systems which write the time from their oscillator to the register at fairly fine granularity. If this recorded update time reflects the time between updates more accurately than a fixed value of 1/f2, it may be used in its place. To use this method, some calculations based on assuming that the period between the register update and the sample that reads that register update is a known value of 1/f2 can advantageously delay (or later revise) that calculation until it is known whether a later sample will read the recorded update time in the following register update, providing a measured value of the time between the initial register update and the next.

There are also many generic means for reducing software-controlled sample time jitter, such as placing the software sampling task as early in the sequence after the main processor cycle real-time interrupt as possible, or scheduling the at a time in the cycle after the worst-case completion of the prior tasks, and waiting in a real time wait loop until the processor clock reaches the scheduled time.

While recording the actual sample time is often the best means of addressing jitter, it should be noted that the averaging in the filter approach reduces its sensitivity to jitter, since the dependency of the output to the results of any single update/sample is low. Filtering means could be added to the "magic pattern" and upper-lower bound methods in cases where jitter effects were limiting, as well.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

The invention claimed is:

1. An apparatus comprising:
    an attitude controller configured to sample a data bus at a frequency (f1) to recover attitude data for a vehicle; and
    an Inertial Measurement Unit (IMU) configured to generate the attitude data for the vehicle, and to update the data bus with the attitude data at a frequency (f2), wherein each update of the attitude data includes a counter for identifying updates to the attitude data on the data bus;
    the attitude controller configured to process counters
    in samples of the attitude data on the data bus to identify a pattern based on the counters of at least one of a missed sample of an update to the attitude data on the data bus and a duplicate sample of an update to the attitude data on the data bus, and to estimate lag times between updates to the attitude data on the data bus from the IMU and samples of the attitude data on the data bus generated by the attitude controller based on the pattern and a relationship between f1 and f2.

2. The apparatus of claim 1 wherein:
    the attitude controller is configured to calculate corrected attitude data based on the estimated lag times, and to calculate a current position of the vehicle based on the corrected attitude data.

3. The apparatus of claim 1 wherein:
    the attitude controller is configured to calculate a least common multiple for 1/f1 and 1/f2, and to estimate the lag times based on the least common multiple.

4. The apparatus of claim 3 wherein:
    the attitude controller is configured to sum the pattern over the least common multiple of samples, to determine that the sum matches a pre-defined value, and to estimate the lag time of a last sample based on f1, f2, and the least common multiple.

5. The apparatus of claim 1 wherein:
    the attitude controller is configured to generate a plurality of time difference estimates between an update time of the attitude data and a sample time of the attitude data based on the pattern and the relationship between f1 and f2, and a filter to filter the plurality of time difference estimates to estimate the lag times.

6. The apparatus of claim 5 wherein:
    the filter is a moving average filter based on a least common multiple for 1/f1 and 1/f2.

7. The apparatus of claim 6 wherein:
    an output of the filter is an estimated lag time of a last sample.

8. The apparatus of claim 1 wherein:
    the attitude controller is configured to calculate an upper bound of estimated lag and a lower bound of estimated lag for each sample based on the pattern and the relationship between f1 and f2.

9. The apparatus of claim 8 wherein:
    the attitude controller is configured to estimate a lag time of a last sample based on the upper bound of estimated lag and the lower bound of estimated lag for previous samples in the pattern.

10. The apparatus of claim 1 wherein:
    f1 is not an integer multiple of f2.

11. The apparatus of claim 10 wherein:
    Q and R are selected as a smallest set of positive integers for which f1/f2=Q/R; and
    an absolute value of (Q–R) is greater than one.

12. An apparatus comprising:
    an attitude controller for a vehicle configured to sample a data bus at a frequency (f1) to recover attitude data for the vehicle; and
    an Inertial Measurement Unit (IMU) configured to generate the attitude data for the vehicle, and to update the data bus with the attitude data at a frequency (f2), wherein each update of the attitude data includes a counter for identifying updates to the attitude data on the data bus;
    the attitude controller configured to process counters in samples of the attitude data on the data bus to identify a pattern based on the counters of at least one of a missed sample of an update to the attitude data on the data bus and a duplicate sample of an update to the attitude data on the data bus,
    to sum the pattern over a least common multiple of f1 and f2, to determine that the sum matches a pre-defined value, and to estimate a lag time of a last sample based on f1, f2, and the least common multiple.

13. The apparatus of claim 12 wherein:
    the attitude controller is configured to calculate corrected attitude data based on the estimated lag times, and to calculate a current position of the vehicle based on the corrected attitude data.

14. The apparatus of claim 12 wherein:
    the pre-defined value is based on f1 and the least common multiple.

15. The apparatus of claim 12 wherein:
    f1 is not an integer multiple of f2.

16. The apparatus of claim 15 wherein:

Q and R are selected as a smallest set of positive integers for which f1/f2=Q/R; and an absolute value of (Q−R) is greater than one.

17. An apparatus comprising:

an attitude controller for a vehicle configured to sample a data bus at a frequency (f1) to recover attitude data for the vehicle; and an Inertial Measurement Unit (IMU) configured to generate the attitude data for the vehicle, and to update the data bus with the attitude data at a frequency (f2), wherein each update of the attitude data includes a counter for identifying updates to the attitude data on the data bus;

the attitude controller configured to process counters in samples of the attitude data on the data bus to identify a pattern based on the counters of at least one of a missed sample of an update to the attitude data on the data bus and a duplicate sample of an update to the attitude data on the data bus, to calculate an upper bound of estimated lag and a lower bound of estimated lag for each sample based on the pattern and a relationship between f1 and f2, and to estimate lag times between updates of the attitude data and samples of the attitude data based on the upper bound of estimated lag and the lower bound of estimated lag for each sample.

18. The apparatus of claim 17 wherein:

the attitude controller is configured to calculate corrected attitude data based on the estimated lag times, and to calculate a current position of the vehicle based on the corrected attitude data.

19. The apparatus of claim 17 wherein:

f1 is not an integer multiple of f2.

20. The apparatus of claim 19 wherein:

Q and R are selected as a smallest set of positive integers for which f1/f2=Q/R; and an absolute value of (Q−R) is greater than one.

\* \* \* \* \*